United States Patent [19]

Marks

[11] 3,864,172
[45] Feb. 4, 1975

[54] BATTERY CONNECTING ASSEMBLY
[75] Inventor: Richard Earl Marks, Houston, Pa.
[73] Assignee: RCA Corporation, New York, N.Y.
[22] Filed: May 17, 1973
[21] Appl. No.: 361,305

[52] U.S. Cl................. 136/173, 136/181, 339/88 R
[51] Int. Cl. .......................................... H01m 1/02
[58] Field of Search.......... 136/173, 181; 339/88 R, 339/152, 22 T, 189 R

[56]       References Cited
        UNITED STATES PATENTS
1,675,114   6/1928   Laird .................................. 136/181
2,751,569   6/1956   Anderson et al................. 339/88 R
3,427,552   2/1969   Sauer et al........................ 339/88 R
3,638,170   1/1972   Clement........................... 339/189 R Primary Examiner—Winston A. Douglas
Assistant Examiner—H. A. Feeley
Attorney, Agent, or Firm—Edward J. Norton; Robert L. Troike

[57] ABSTRACT

An assembly for rapidly mounting a battery to an electrical device includes a supporting camming plate with a large opening and smaller notches at opposite sides of the opening with the plate mounted across a recess in the electrical device. The battery case has an protruding member with a pair of lugs extending radially from the protruding member. Each of the lugs includes a symmetrically shaped camming portion of gradually increasing and then decreasing extension from the inward surface of the lug. The protruding member is adapted to be inserted into the opening in the plate by passing the pair of lugs through the notches and after being inserted through the opening to be given partial rotation to carry the lugs out of alignment with the notches so that the camming portion is under the plate.

3 Claims, 6 Drawing Figures

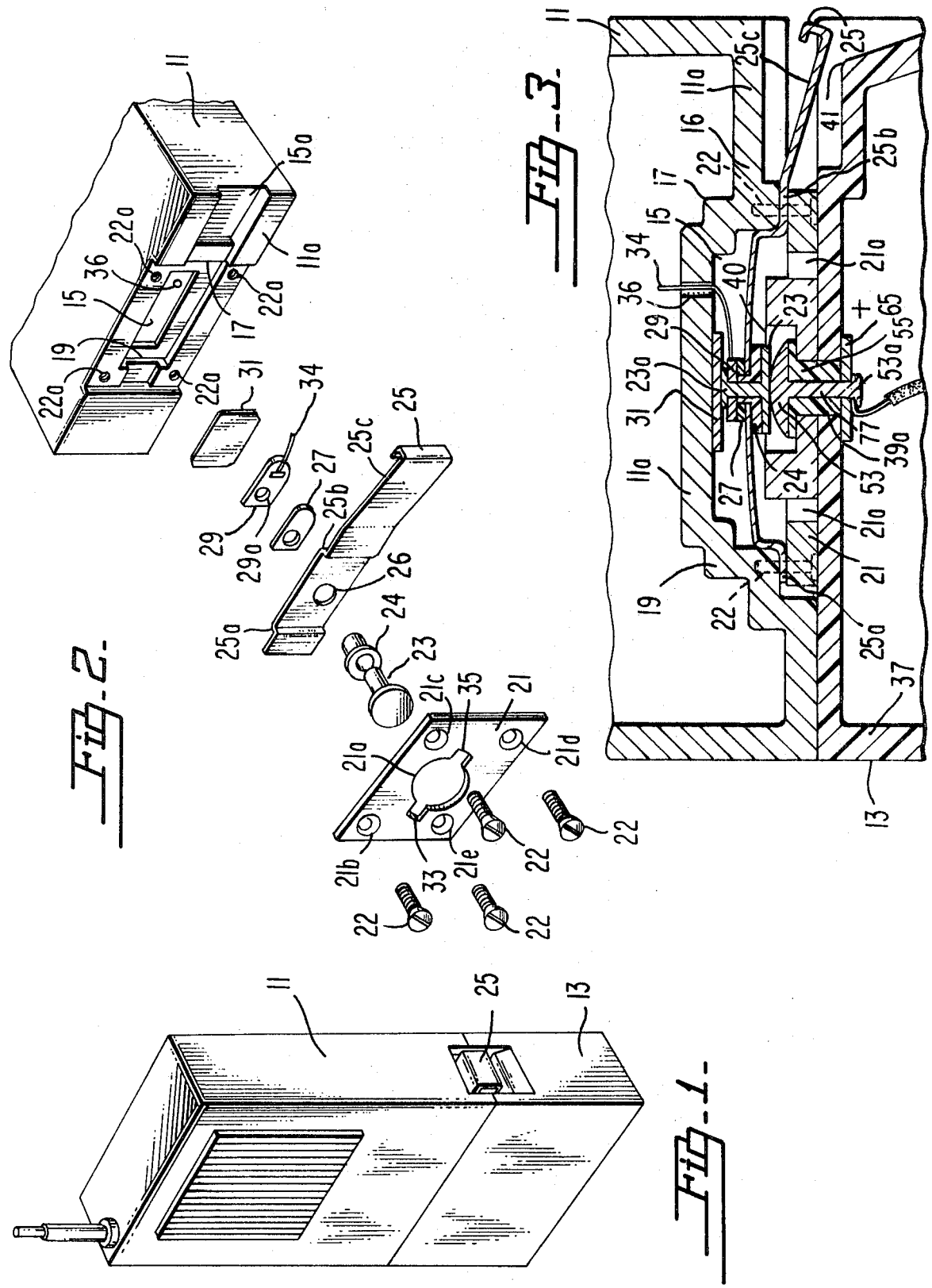

PATENTED FEB 4 1975 3,864,172
SHEET 2 OF 2
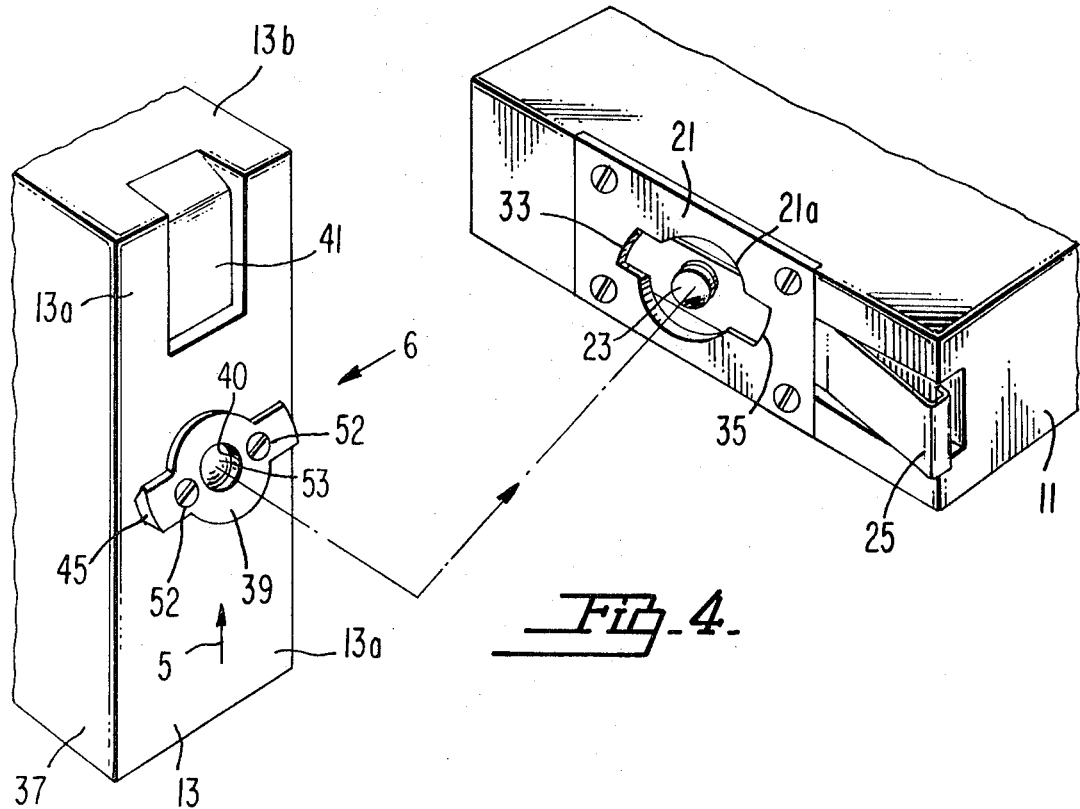
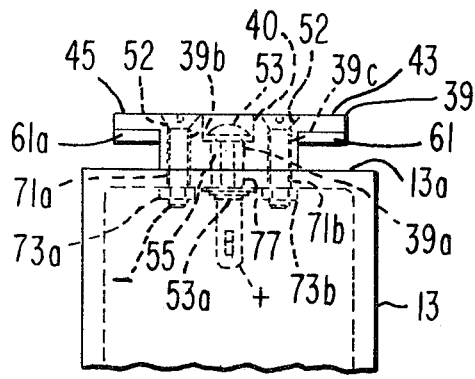
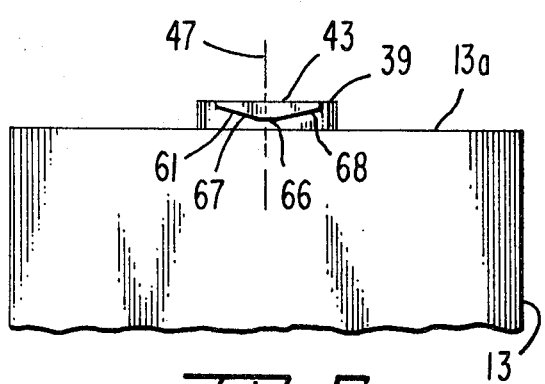

3,864,172

BATTERY CONNECTING ASSEMBLY

BACKGROUND OF THE INVENTION

This invention relates to a battery connecting assembly and more particularly to an assembly for permitting the easy and rapid mounting of a battery to an electrical device such as a portable radio.

Electrical devices and in particular portable radios are currently in wide use by the general public. Specialized radios such as the portable radios used by policemen and firemen require ultra-reliability; and if these radios are battery operated, as in the typical case, the batteries themselves must be reliable and quickly and easily changed to enable emergency messages to be both transmitted and received. Also, since the policeman and his radio are often called upon to operate in poor conditions of weather and visibility, it is highly desirable that this battery connection assembly be as foolproof as possible with the replacement requiring the minimum of thought and time.

In the prior art many types of battery connections are available. The simple insertion of batteries into chambers usually requires the user to read the polarization of the batteries and then insert them correspondingly. This takes time and in emergency situations is generally considered unsatisfactory. Further, it is desirable that these batteries be packaged so as to be rapidly placed in charging mechanisms. In another type of known battery connecting assembly, the battery case is provided with a bolt shaped structure extending from the case and a receptive thread located on the radio. The disadvantage of this structure is that the user must know beforehand which way to rotate the device to lock the battery case to the device. Although this appears to be a simple procedure, this procedure has been troublesome during emergency situations and in particular in conditions of poor visibility.

Briefly, according to the present invention, an improved assembly for easily and rapidly mounting a battery to an electrical device in a manner to provide a good electrical contact between a battery terminal and a device terminal is provided. A supporting plate is provided having a large opening therein and a pair of smaller notches at opposite sides of the large opening. The body of the device is recessed at the device electrical terminal. The supporting plate is mounted across the recess in the device to form a receptacle. A battery case is provided having at one end thereof a protruding member. The protruding member has a pair of radially extending lugs with each lug having a symmetrically shaped camming portion of gradually increasing and then decreasing extension. The protruding member is adapted to be inserted into the large opening in the plate by passing the pair of lugs through the pair of notches and after being inserted through the large opening to be given partial rotation in either clockwise or counterclockwise direction to carry the lugs out of alignment with the notches so that the camming portion is under the plate to cam the protruding member and the battery case tightly against the device.

A more detailed description of the assembly follows in conjunction with the following drawings wherein:

FIG. 1 is a front elevation view of a portable radio with a battery case connected thereto.

FIG. 2 is an exploded view of the connecting end of the portable radio shown in FIG. 1.

FIG. 3 is a cross-sectional view of the assembly portion of the assembled portable radio and battery case.

FIG. 4 is an unassembled view of a portion of the battery case and the radio.

FIG. 5 is a side elevation view of the protruding member and a portion as viewed along arrow 5 in FIG. 4.

FIG. 6 is a side elevation view of the protruding member and a portion of the battery case as viewed along arrow 6 in FIG. 4.

Referring to FIG. 1, there is illustrated a portable radio 11 and a battery case 13 coupled to the bottom end thereof. The radio 11 includes all the electronic circuitry, the speaker, the microphone, and so on. The battery case 13 houses the source of potential for operation of the radio.

Referring to FIGS. 2 thru 6, there is illustrated in more detail the battery connecting assembly. Referring to FIGS. 2 and 3, the radio apparatus 11 has at its bottom end a conductive wall 11a. Wall 11a has a first recess 15 with stepped sides 17 and 19 and a second recess 15a adapted to receive a portion of a spring finger 25. The recess 15 has mounted therein an insulator plate 31, an oblong conductive terminal plate 29, an oblong insulator member 27, a portion of the metal locking spring finger 25, a conductive rivet 23, an insulator rivet 24 and a conductive supporting plate 21.

Referring to FIGS. 2 and 3, it is seen that the insulator plate 31 is mounted in the recess 15 at the bottom end wall 11a. The insulator plate 31 is fixed to wall 11a in recess 15 by glue or other suitable bonding material. A wire 34 is connected to the terminal plate 29 near one oblong end thereof and is coupled in insulative manner to the inside of the radio 11 through an aperture 36 in the bottom end wall 11a. This wire 34 is coupled to the electrical circuitry of the radio.

The locking spring finger 25 is fixed to the radio 11 with a portion thereof within the recess 15 by clamping the spring finger 25 between wall 11a and the supporting plate 21 using screws 22 as shown in FIG. 3. The wall 11a has four threaded apertures 22a therein at the recess 15 adapted to receive and hold screws 22 therein. The supporting plate 21 is held tightly against the spring finger 25 and wall 11a by the screws 22 which pass through the apertures 21b, 21c, 21d, and 21e in plate 21 and apertures 22a.

The locking spring finger 25 is of stainless spring steel and is preformed to present a bias to the finger 25 when mounted to the radio apparatus 11 so that the finger 25 near end 25c extends away from the recess 15a of wall 11a of radio 11 toward the battery case 13 as shown in FIGS. 3 and 4. The rivet 23 is of conductive material and passes through insulator rivet 24, an aperture 26 within locking spring finger 25, insulator 27 and an aperture 29a in terminal plate 29. The rivet 23 is clinched at end 23a, fixing insulator rivet 24, the finger 25, insulator 27 and terminal plate 29 together. The rivet 23 is insulated from the locking spring finger 25 by the insulator rivet 24 which passes coaxially with the rivet 23 through the aperture 26 in spring finger 25 with the insulator rivet 24 between the spring finger 25 and rivet 23. The terminal plate 29 is insulated from spring finger 25 by insulator 27. The insulator 27 is elongated like the plate 29 to insulate the wire 34 and the wire connection to plate 29 from the spring finger 25.

The supporting plate 21 has a large opening 21a at the center thereof and a pair of smaller notches 33 and 35 at opposite sides of the large opening 21a. The supporting plate 21 is mounted by the four screws 22 over the recess 15 with the large opening 21a centered over the rivet 23 and the notches 33 and 35 extending along the lengthwise axis of the spring finger 25. As the supporting plate 21 is fixed to the wall 11a, the spring finger 25 and the pieces riveted thereto are fixed to the radio 11.

Referring to FIGS. 3 and 4, there is shown the assembly portion of the battery case 13. The battery case 13 includes a main body portion 37 of plastic material and a protruding locking member 39 of electrically conductive material. The main body portion 37 has a locking finger groove 41 therein which extends along a portion of the plastic top wall 13a and a portion of side wall 13b of the main body portion 37 with the width of the groove 41 slightly larger than the width of the spring finger 25. The portion of the groove 41 along the top wall 13a permits the locking spring finger 25 in its normal unflexed state to lodge therein to lock rotation of the battery case 13. The portion of the groove 41 along the side wall 13b permits a finger or thumb of the user to release the spring finger 25 from the battery case 13 by flexing it into recess 15a.

The protruding locking member 39 extends from the top wall 13a as shown in FIGS. 3 thru 5. The protruding locking member 39 is mounted to the top wall 13a by a pair of screws 52 which extend through the protruding locking member 39 via apertures 39b and 39c, the top wall 13a via apertures 71a and 71b and a pair of threaded nuts 73a and 73b (dashed line) within the battery case 13. See FIG. 5.

Referring to FIGS. 3 and 5, the protruding locking member 39 has an aperture 39a and a recess 40 in the center. A conductive contacting rivet 53 insulated by insulator rivet 55 is located in the center of aperture 39a and extends with insulator rivet 55 through aperture 39a, and aperture 77 in the top wall 13a of the battery case 13. The unit 53 through a battery terminal plate 65 located within the battery case 13. The rivet 53 is clinched at end 53a to fix the rivet 53 and insulator 55 to case 13. See FIG. 3. Positive (+) battery potential is coupled to terminal plate 65 and is insulated from locking member 39 by the plastic wall 13a.

The protruding locking member 39 includes a pair of radially extending lugs 43 and 45. See FIGS. 4, 5 and 6. The protruding locking member 39 and lugs 43 and 45 are adapted to be inserted into the supporting plate 21 by passing the pair of lugs 43 and 45 through the pairs of notches 33 and 35 in the supporting plate 21. Referring to FIGS. 5 and 6, the lugs 43 and 45 have generally V-shaped camming portions 61 and 61a, respectively, which extend toward the top wall 13a of the main body portion 37 so as to provide when the lugs 43 and 45 are rotated relative to supporting plate 21 a gradual decrease in the spacing between the lugs 43 and 45 and the top wall 13a. The generally V-shaped camming portion has flattened at the peak 66. The flattened peak 66 of the camming portion 61 of lug 43 is located along the center line 47 of the lug 43 as shown in FIG. 6. The sides 67 and 68 of the camming portion 61 slope symmetrically on either side of the flattened peak 66 with the length of the sides 67 and 68 of the camming portion 61 on either side of the peak 66 being about the same. The structure of the camming portion 61a of lug 45 is identical with that of camming portion 61.

In assembling the battery case 13 to the radio 11, the protruding portion 39 is passed through the aperture 21a in supporting plate 21 by passing the pair of lugs 43 and 45 through the notches 33 and 35 in supporting plate 21. The battery case 13 is then rotated to carry the lugs 43 and 45 out of alignment with the notches 33 and 35. As the case 13 is rotated one quarter turn, the supporting plate 21 is cammed tightly between the lugs 43 and 45 and the top wall 13a of the battery case 13. When finger 25 is aligned with groove 41 in the battery case 13, the battery case 13 is locked from rotation. As the lugs 43 and 45 are driven out of alignment with the notches 33 and 35, the camming portions 61 ride against the supporting plate 21 with the battery case 13 being held more tightly as the supporting plate 21 is gradually clamped between the camming portion 61 and top wall 13a. When the peak 66 of the camming portion 61 and the peak of camming portion 61a are under the plate 21 at about one quarter turn, the protruding locking member 39 of the battery case 13 and the top wall 13a provide maximum clamping to the supporting plate 21 of the radio device 11. Since the camming portion 61 is substantially symmetrical about the center line and camming portion 61a is identical to portion 61, the camming and gradual clamping operation may be done in either a clockwise or counter-clockwise direction. The battery case 13 will lock only at the one rotated position wherein there is alignment of finger 25 within groove 41 in battery case 13. The battery case 13 is locked with a one quarter turn of the case 13 in one direction of rotation and is locked with a three quarter turn of the case 13 in the opposite direction of rotation. When the battery case 13 is in its locked position, the center contact rivet 53 makes contact with rivet 23 which is, in turn, coupled to wire 34 via terminal plate 29. See FIG. 3. Since the rivet 53 is connected to terminal plate 65 and positive battery potantial is coupled to plate 65, the positive potential is coupled to the circuitry in the radio via the rivets 23 and 53. The ground or negative terminal of the battery is coupled to one of the screws 52 inside the battery case 13. The protruding locking member 39 coupled to the screws 52 is therefore at the ground or negative potential. When the lugs 43 and 45 are passed under the supporting plate 21, electrical contact between the conductive protruding locking member 39 and the supporting plate 21 is made, placing the supporting plate 21, the spring 25 and wall 11a at ground or negative potential. The ground or negative terminal of the circuitry within the radio is electrically connected to the conductive wall 11a by the suitable means, not shown.

The whole assembly is unlocked by depressing metal spring finger 25 toward the radio 11 to free rotation of the protruding locking member 39. By rotation of the protruding member 39 to align the lugs 43 and 45 with the notches 33 and 35, the battery case may be disengaged and pulled out.

What is claimed is:

1. In combination, an electrical device, a supporting plate having a large opening therein and a pair of smaller notches at opposite sides of said large opening, said plate being mounted across a recess in the body of said device located along a first wall thereof, a first electrically conductive contactor extending into said recess and centered with respect to said large opening and coupled to circuitry within said electrical device, a battery case adapted to hold at least one battery therein, said case including at one end a protruding member extending from one wall of said battery case and having a pair of radially extending lugs, said protruding member having an aperture in the center thereof, a second electrically conductive contactor extending in insulative manner from a terminal of said battery into said aperture in said protruding member, said protruding member and said lugs being adapted to be inserted into said large opening in said plate by passing the pair of lugs through said pair of notches in said plate whereby to dispose said lugs at the side of said plate opposite the plate side adjacent said one wall of said battery case, said lugs including a generally symmetrically shaped camming portion having a peak extending toward said one wall of said battery case with the peak of the camming portion arranged such that after the protruding member is given a partial rotation in either direction from the position thereof in which said lugs are in said notches said plate is clamped between the peak of the camming portions and said one wall of the battery case and said first and second contactors make electrical contact, and means for releasably latching said battery case from rotation when clamped to said plate.

2. The combination as claimed in claim 1 wherein said latching means includes a locking spring finger mounted into the recess of said body of said electrical device and generally along said first wall of said device with one end thereof extending away from said first wall of said electrical device, said first wall having a groove therein adjacent said one end of said spring finger adapted to house said spring finger when said battery case is being rotated, said one wall of said battery case having a groove adapted to receive said locking spring finger when said groove in said battery case is aligned with said groove in said first wall of said device.

3. In combination, an electrical device, a supporting plate having a large opening therein and a pair of smaller notches at opposite sides of said large opening, said plate being mounted across a recess in the body of said device located along a first wall thereof, a first electrically conductive contactor extending into said recess and centered with respect to said large opening and coupled to circuitry within said device, a battery case adapted to hold at least one battery therein, said case including at one end a protruding member extending from one wall of said battery case and having a pair of radially extending lugs, said protruding member having an aperture in the center thereof, a second electrically conductive contactor extending in insulative manner from a terminal of said battery into said aperture in said protruding member, said protruding member and said lugs being adapted to be inserted into said large opening in said plate by passing the pair of lugs through said pair of notches in said plate whereby to dispose said lugs at the side of said plate opposite the plate side next to said one wall of said battery case, said lugs including a generally V-shaped portion extending toward said one wall of said battery case with the peak of the V-shaped portion arranged such that after the protruding member is given a rotation of a quarter turn in either direction from the position thereof in which said lugs are in said notches said plate is clamped between said V-shaped portion and said one wall of said battery case and said first and second contactors make electrical contact.

* * * * *